Oct. 12, 1965  J. WISNICKI  3,211,325
NON-STICK SURFACE FOR COOKING VESSEL OR THE LIKE
Filed July 11, 1963  2 Sheets-Sheet 1

WITNESSES
Theodore T. Wrobel
James F. Young

INVENTOR
Julian Wisnicki
BY
Robert T. French
ATTORNEY

Oct. 12, 1965   J. WISNICKI   3,211,325
NON-STICK SURFACE FOR COOKING VESSEL OR THE LIKE
Filed July 11, 1963   2 Sheets-Sheet 2

3,211,325
NON-STICK SURFACE FOR COOKING
VESSEL OR THE LIKE
Julian Wisnicki, Pittsburgh, Pa., assignor to Westinghouse Electric Corporation, Pittsburgh, Pa., a corporation of Pennsylvania
Filed July 11, 1963, Ser. No. 296,152
(Filed under Rule 47(b) and 35 U.S.C. 118)
7 Claims. (Cl. 220—64)

This application is a continuation-in-part of applicants copending application for Method of Manufacturing Appliances, Serial No. 212,885, filed July 27, 1962.

This invention relates to formation of solid surfaces to which foreign matter, such as food, for example, will adhere only slightly or not at all; it also concerns articles, such as cooking vessels, having such surfaces.

Materials and methods are known for converting solid surfaces, to which food particles or other foreign matter might adhere, to so-called "non-stick" surfaces, as by application of a suitable anti-stick agent. While non-stick surfaces have particular utility in cooking vessels, such as frypans, griddles, waffle irons, and coffeemakers, for example, they are also useful in other heated articles, which may or may not come into contact with food, such as oven liners, reaction vessels, and flatiron soleplates, to name but a few. An example of an unheated article that is improved by non-stick surfaces is a lawn mower casing, especially the underside of a rotary lawn mower, to which grass cuttings tend to adhere.

Attempts to provide non-stick surfaces, as by coating a metal surface with an anti-stick material have been only partially successful. Where the metal surface itself is smooth, the anti-stick material is too readily removeable. Where the metal surface is rough, finely divided foreign matter tends to be retained thereby, thus altering to some extent the appearance of the surface and impairing its non-stick character.

A primary object of the present invention is reduction in the porosity of non-stick surfaces.

An object is provision of non-stick surfaces with improved hardness and smoothness.

Another object is novel aftertreatment of coated non-stick surfaces.

A further object is provision of non-stick surfaces from which essentially no anti-stick material used thereon can be removed by scraping that will not remove particles of the supporting surface itself.

Another object is to reposition the non-stick material of the surface and also the material of the supporting surface below.

Other objects of the present invention, together with means and methods for attaining the various objects, will be apparent from the following description and the accompanying diagrams.

In general, the objects of the present invention are accomplished, in the fabrication of a non-stick surface having a porous solid component impregnated with an anti-stick agent, by peening the surface. The invention contemplates particularly a process of fabricating a non-stick surface, comprising forming on a solid metal base a porous intermediate layer of compatible material, depositing on that layer and in pores thereof an excess of polytetrafluoroethylene resin, and shot-peening the exposed surface, thereby repositioning and smoothing the material of the porous layer and the layer of resin, and reducing the remaining porosity of the layer and binding the resin impregnated therein.

Figure 1:
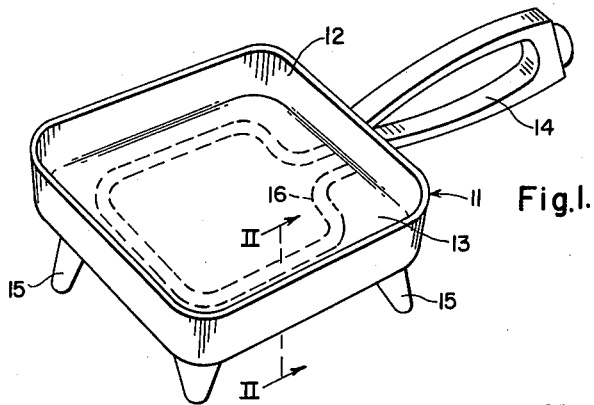
FIG. 1 is a perspective view of an internally electrically heated frypan having a non-stick surface.

FIG. 1 shows, in perspective, a frypan 11 having a dished body 12 with a cooking surface 13 and having a handle 14 attached to one side and four legs 15 (only three being visible) attached to the bottom of the body. The cooking surface is adapted to be heated by an electrical heating element 16 embedded thereunder in the body and indicated by broken double lines.

Figure 2:
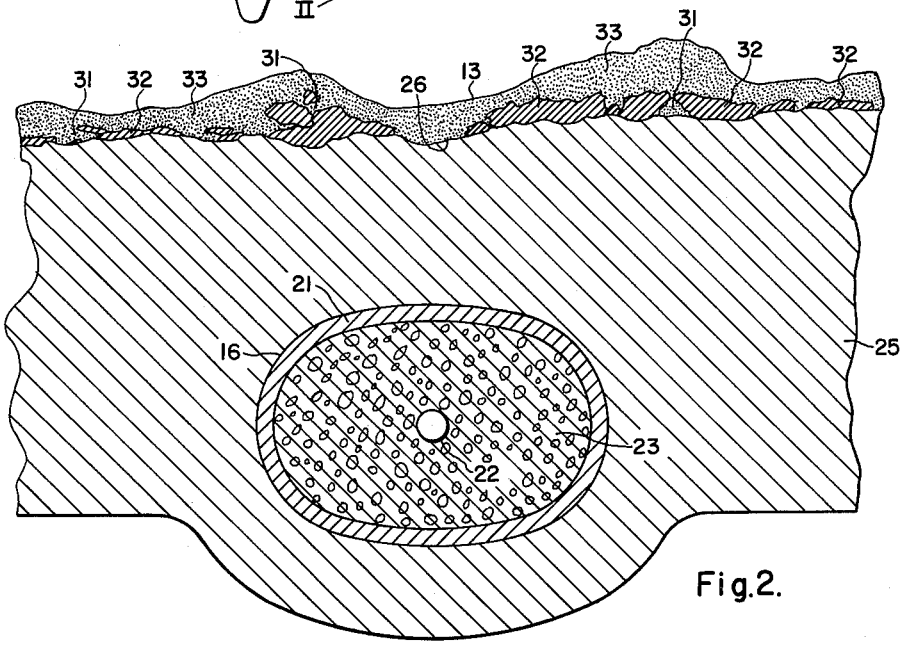
FIG. 2 is a transverse sectional elevation through a portion of the article of the preceding view, at II—II thereon; but before the surface is peened.
Figure 3:
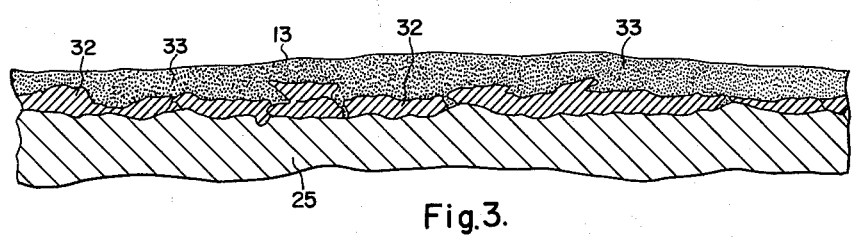
FIG. 3 is a similar but more fragmentary transverse sectional elevation of a non-stick surface after peening according to this invention.

FIG. 2 shows, in sectional elevation, a portion of the cooking surface and underlying portion of the body with the heating element embedded therein. The heating element 16 includes a sheath 21, which is shown oval in cross-section, with an electrical conductor 22 centered therein, the intervening space being filled with a granular refactory material 23. The sheath is surrounded by base 25 of the body of the frypan, which bulges downward adjacent the sheath. The heating element being wholly conventional, no further description of it is necessary.

As shown in FIG. 2, the cooking surface 13 is greatly enlarged in the vertical direction, on the order of a hundred times, while the base 25 is enlarged only a fraction, perhaps one-fifth, as much. It is apparent that the cooking surface may be considered to be a layer on the rough upper surface 26 of the base and, therefore, may be referred to as a "surface layer" or merely "layer," still designated generally as 13. Such surface layer is visibly porous, having a multiplicity of pores 31 in and about pore-defining material 32 (shown finely sectioned) which may be generally continuous or somewhat intermittent along the upper surface 26 of the base (i.e., at the interface between base and surface layer). In general, from about ten to sixty percent of the volume of the surface layer will be made up of pores, as compared with the pore-defining material 32, which makes up the remaining volume of the layer. Filling the pores or extremities thereof about the peaks of the pore-defining material is an anti-stick material 33, shown lightly stippled.

Perhaps the most common composition for the base 25 is aluminum, although many other metals, alloys, and even non-metallic (e.g. ceramic) materials can be used. The pore-defining material should be chemically compatible and physically adherent to the base material, and a similarly wide range of compositions is available. Thus, the layer of pore-defining material on the aluminum base of an electrically heated frypan, such as is shown here, may itself be made of aluminum, but need not be. In addition to aluminum, the following metallic materials are preferred for use on an aluminum base: copper, iron, nickel, and alloys containing one or more of the metals already mentioned.

The porous surface layer may be formed by sintering a layer of suitable powder in situ, or preferably by spray-coating the material onto the base. In the latter method the pore-defining material is fed in the form of wire or finely divided solid into a torch, which melts and sprays it onto the base material. An oxyacetylene or oxyhydrogen torch may be used, as may a torch employing a constricted electric arc, known as Plasma Jet. The porous layer is built to a thickness of about 0.002 to 0.015 inch. While thicker layers may be used, no corresponding advantage offsets the additional cost of doing so.

The anti-stick material may conveniently be a fluorocarbon resin or a silicone resin, e.g., polytetrafluoroethylene. Such material is commercially available under the brand name "Teflon." The material need not be homopolymers, but may be copolymers or telemers. Its degree of polymerization will be sufficiently high to ensure formation of a hard solid form thereof, regardless of whether applied in the form of a liquid or solid of low molecular weight, or in solution or dispersion.

The anti-stick material may conveniently be applied to an existing porous layer in the form of an aqueous dispersion. The anti-stick material is separated from the water by heating, salting, or in any suitable manner, and is cured with or without the application of heat, often in the presence of a catalyst, as is customary for the material selected.

Impregnation of the porous surface layer with the antistick material is facilitated by evacuation of the porous surface layer before application of the anti-stick material, and the restoration of atmospheric pressure subsequent thereto. More than enough anti-stick material is applied to cover the surface, preferably an excess of .001 to .002 inch. Alternatively, the anti-stick material may be fed through a torch or jet simultaneously with and either separate from or together with the pore-defining material. Impregnation and curing usually occur substantially simultaneously in such procedure.

According to the present invention it is desirable to provide an appreciable excess of anti-stick material as indicated above, as a thin layer or coating. Such a layer or coating appears in all of FIGS. 2 to 7, inclusive, covering peaks of the pore-defining material 32. This excess layer may be applied together with the underlying or impregnating anti-stick material (lighter stippling) in a subsequent step. Thus, the porous layer may be vacuum-impregnated with an anti-stick material, as suggested above, and then such an overlay of the same or a different anti-stick material may be applied after restoration of atmospheric pressure to the surface. However, it has been found that satisfactory results are obtained by single spraying the anti-stick material on in a simple application.

The final step in the process of the present invention is a peening of the surface layer, which itself preferably includes the thin overlying coating of anti-stick material as indicated above. While this can be done manually or mechanically by repeatedly striking the surface with a hammer or a multiplicity of hammers, the preferred method involves subjecting the surface to the impact of many small, hard spheres, known in the trade as "shot-peening." The peening step forces the anti-stick material further or more tightly into the pores of the pore-defining material, decreasing the porosity thereof, as may be shown by a dye-absorption test.

Of greater importance, the peening step actually repositions the porous metal 32 of the intermediate layer and provides that layer with a much smoother surface than results from the original application thereof to the base material 25. Not only is the intermediate porous material repositioned, but the rough surface of the base material 25 also is somewhat repositioned and smoothed.

Since the non-stick material 33 fills the pores provided by the porous intermediate layer 32, the repositioning of the material 33 increases the holding effect of this material with respect to the non-stick material 33, thereby firmly anchoring the non-stick material. As the intermediate porous material is repositioned and smoothed, the cooking surface or top layer of non-stick material 33 is also repositioned to follow the intermediate layer and present a similarly smoothed surface.

This repositioning of the porous intermediate material 32 and of the overlying non-stick material 33 is clearly illustrated by the micro-photographs of FIGURES 4, 5, 6 and 7.

Figure 4:
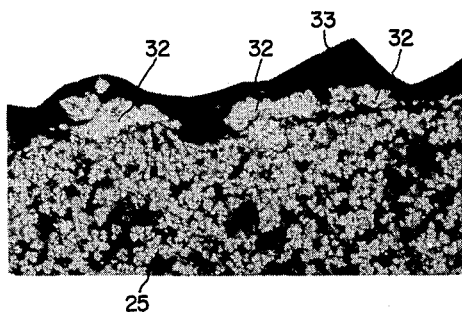
FIG. 4 is a micro-photograph, enlarged 100×, of a vertical section through the upper portion of a griddle constructed in accordance with the present invention, but without the peening operation.
Figure 5:
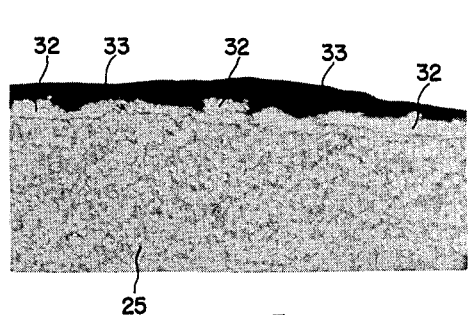
FIG. 5 is a micro-photograph, similar to FIG. 4, of another section of the same griddle, after performance of the peening operation.

FIGS. 4 and 5 are sections through the cooking surface of an electric griddle, the section of FIG. 4 being made before the griddle cooking surface was peened, and the section of FIG. 5 being made after peening of the surface.

In FIG. 4, both the surface of the base metal 25 and the intermediate porous layer 32 are very irregular as is the surface of the non-stick material 33.

After peening (FIG. 5) the surface of the base metal 25 is much smoother, the intermediate porous material 32 has been repositioned to fill previously existing gaps therein and the non-stick material 33 has followed and conformed to the repositioned porous material, completely covering the latter.

The before peening (FIG. 6) and after peening (FIG. 7) sections through a frypan utilizing the present invention similarly illustrate the repositioning and smoothing of the porous intermediate material 32 and the repositioning and following of the non-stick material 33 relative to the porous material 32.

Figure 6:
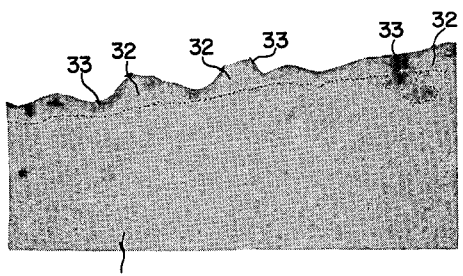
FIG. 6 is a micro-photograph, enlarged 100×, of a vertical section through the upper portion of a frypan constructed in accordance with the present invention, but without the peening operation.
Figure 7:
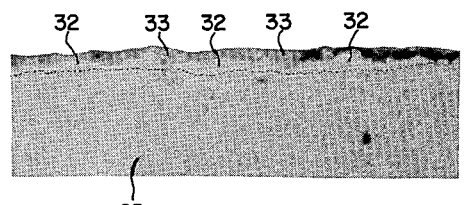
FIG. 7 is a micro-photograph, similar to FIG. 6, of another section of the same frypan, after performance of the peening operation.

The micro-photographs of FIGURES 6 and 7 were taken using dark field illumination to accentuate the non-stick coating. Consequently, the interface of the base metal 25 and the porous intermediate metal 32 is not readily recognizable and a stippled line has been added to indicate the approximate location of the interface in these two figures.

FIGS. 4 and 6 show that the non-stick material 33 fills the pores and spaces provided by the porous intermediate material 32 and FIGS. 5 and 7 illustrate the interlocking of the non-stick material and the repositioned porous material as result of the peening operation.

The improved bonding of the anti-stick material may be demonstrated by scraping the surface as forcibly as possible without, of course, actually using sufficient force or an implement hard enough to fracture the pore-defining material itself. The desirability of positive retention of the anti-stick material, especially where the non-stick surface so formed is used for cooking purposes or otherwise comes into contact with food, is readily apparent. The present invention provides a non-stick surface that is "permanent," that is, one that lasts as long as the supporting article.

In applying a non-stick surface to an electrically heated frypan, the following method was used with satisfactory results.

The cooking surface of a cast aluminum frypan was grit blasted to roughen the surface, finely powdered aluminum was melted and sprayed on the roughened surface by a Plasma Jet spray to effect a porous intermediate layer, the porous surface was vacuum impregnated with an excess of polytetrafluoroethylene resin in liquid form, the resin was cured by heating in an oven at about 475° F., and the cured surface was shot-peened by dropping .125″ diameter steel balls thereon from a height of approximately 18 inches.

An equally satisfactory (and presently preferred) procedure which has been utilized is the same as that described above except that instead of vacuum-impregnating the porous surface, the liquid polytetrafluoroethylene was sprayed on the porous surface to impregnate and cover it.

This invention may be deemed an improvement upon the invention disclosed and claimed by Robert M. Wolf in his patent application for Surface Construction and Methods of Manufacture, Serial No. 133,103, filed August 22, 1961, the disclosure of which is incorporated herein by reference. This is not to say that the process of the present invention is not applicable, with or without modification not involving a departure from the inventive concept, to other procedures or articles, however. This in- The claimed invention:

1. Cooking vessel having a solid metal base and a non-stick surface fabricated by forming on said solid metal base a porous layer of compatible material, depositing on that layer and in pores thereof an excess of polytetrafluoroethylene resin, and shot-peening the exposed surface to reposition the material of the porous layer, thereby reducing the remaining porosity of the layer and binding the resin impregnated therein.

2. In a cooking vessel, a peened non-stick surface comprising a porous layer impregnated with an anti-stick material.

3. The article of claim 2 wherein essentially none of the anti-stick material is removable from the surface by scraping harmless to the porous layer impregnated therewith.

4. Cooking vessel having a solid base of aluminum, a porous layer of aluminum thereon impregnated with polytetrafluoroethylene resin, the exposed impregnated surface being characterized by island peaks of aluminum surrounded by the resin, the peaks being peened outward and over adjacent portions of the resin.

5. A cooking vessel having a solid metal base and a non-stick surface fabricated by forming on the solid metal base a porous layer of compatible material, depositing on said layer and in pores thereof an excess of polytetrafluoroethylene resin, and shot-peening the exposed surface, thereby reducing the remaining porosity of the layer and binding the resin impregnated therein, said fabricated non-stick surface exhibiting island peaks of the compatible material surrounded by the resin with said peaks deformed outwardly over adjacent portions of the resin.

6. A cooking vessel having a solid metal base and a non-stick surface fabricated by forming on the solid metal base a porous layer of compatible material, depositing on said layer and in the pores thereof an excess of polytetrafluoroethylene resin, and shot-peening the exposed surface, thereby reducing the remaining porosity of the layer and binding the resin impregnated therein.

7. A cooking vessel having a metal base and a non-stick surface provided by forming on the metal base a porous layer of compatible material, said layer having an uneven surface contour, depositing on said layer and in the pores thereof a non-stick agent selected from the class consisting of fluorocarbon polymers and silicone resins, and thereafter repositioning the material of the porous layer generally from higher to lower levels, thereby reducing the remaining porosity of the layer and binding the non-stick material impregnated therein.

References Cited by the Examiner
UNITED STATES PATENTS

| | | | |
|---|---|---|---|
| 2,462,242 | 2/49 | Webb et al. | 220—64 |
| 2,470,593 | 5/49 | Webb et al. | 220—64 |
| 3,008,601 | 11/61 | Cahne | 220—64 |

References Cited by the Applicant
UNITED STATES PATENTS

| | | |
|---|---|---|
| 2,187,086 | 1/40 | Koehring. |
| 2,537,433 | 1/51 | Waring. |
| 2,607,983 | 8/52 | McBride. |
| 2,691,814 | 10/54 | Tait. |
| 2,765,728 | 10/56 | Pearce. |
| 2,944,917 | 7/60 | Cahne. |
| 3,052,590 | 9/62 | Maros et al. |

LOUIS G. MANCENE, *Primary Examiner.*

THERON E. CONDON, *Examiner.*